No. 767,811. PATENTED AUG. 16, 1904.
R. GOOD, Jr.
MACHINERY FOR THE MANUFACTURE OF GLASSWARE.
APPLICATION FILED FEB. 6, 1904.
NO MODEL. 8 SHEETS—SHEET 1.
FIG. I.
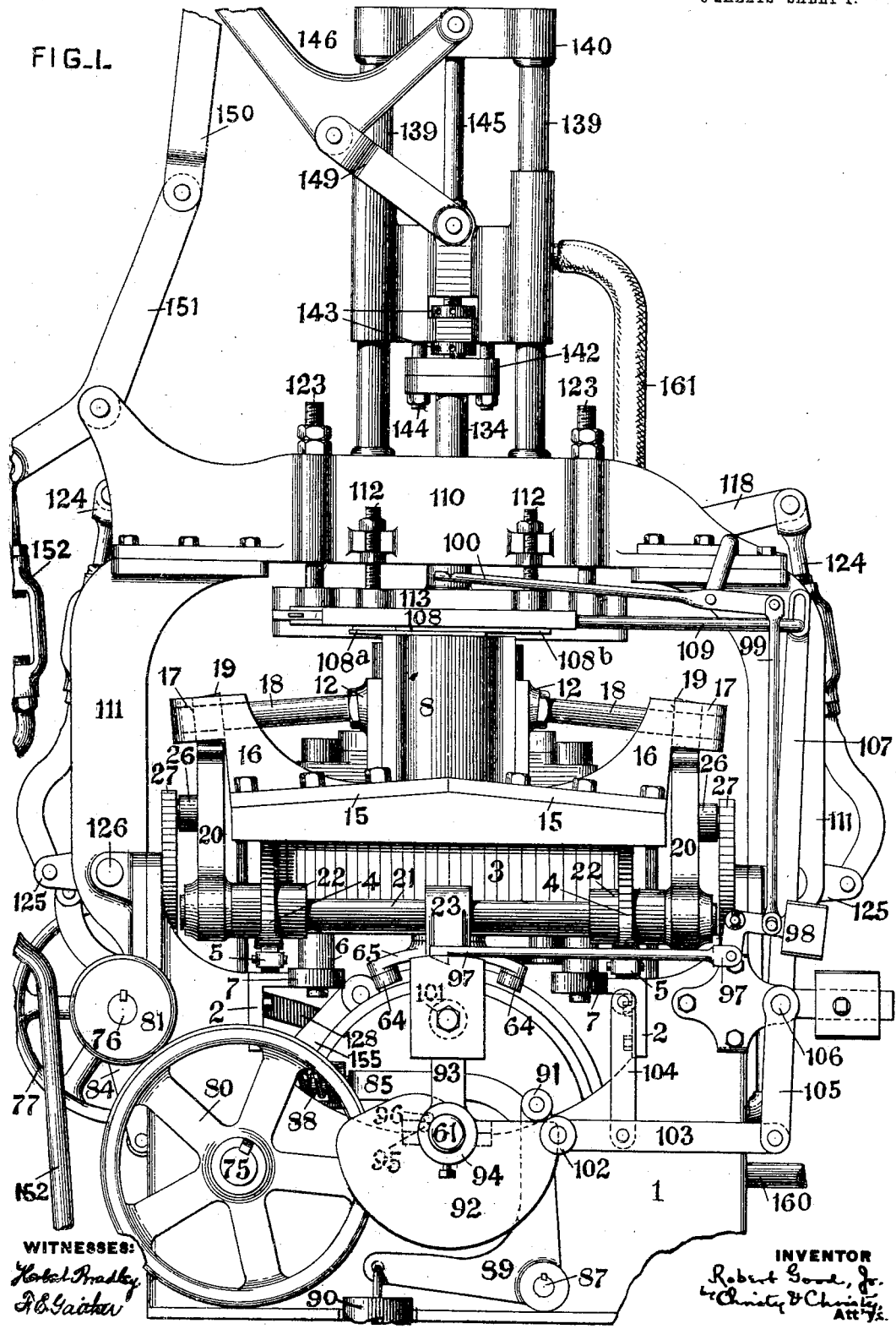
WITNESSES:
INVENTOR
Robert Good, Jr.
by Christy & Christy
Att'ys.

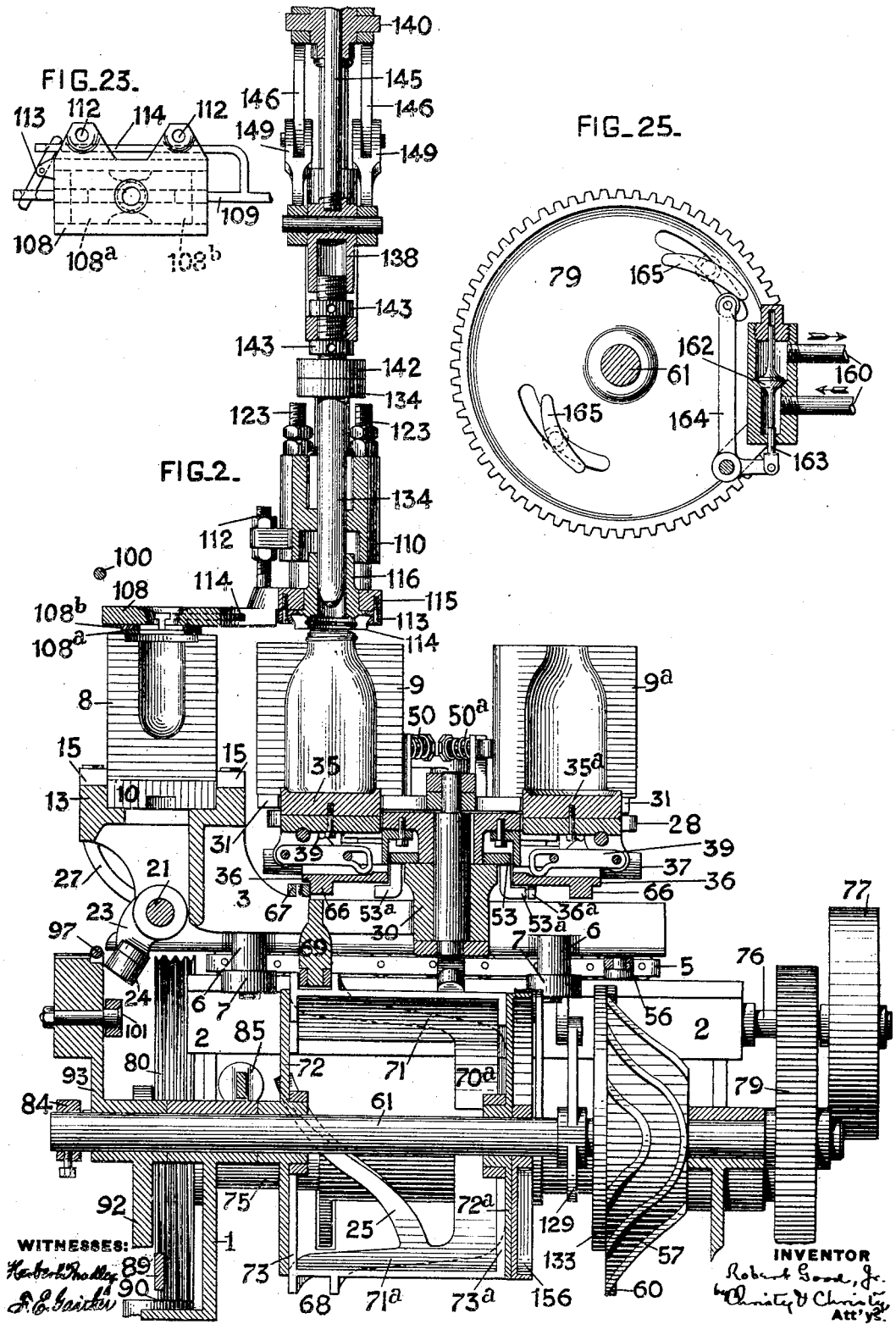

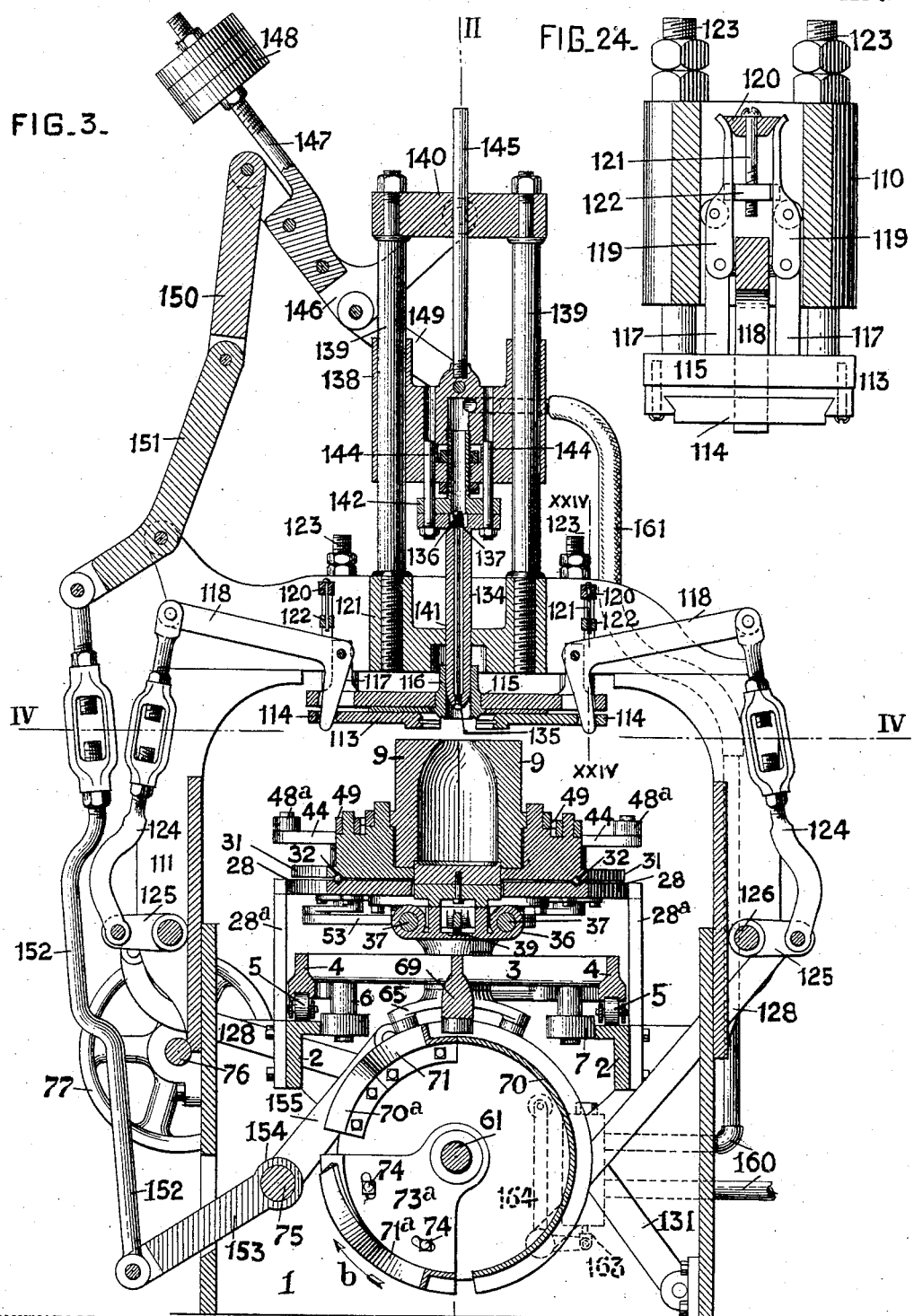

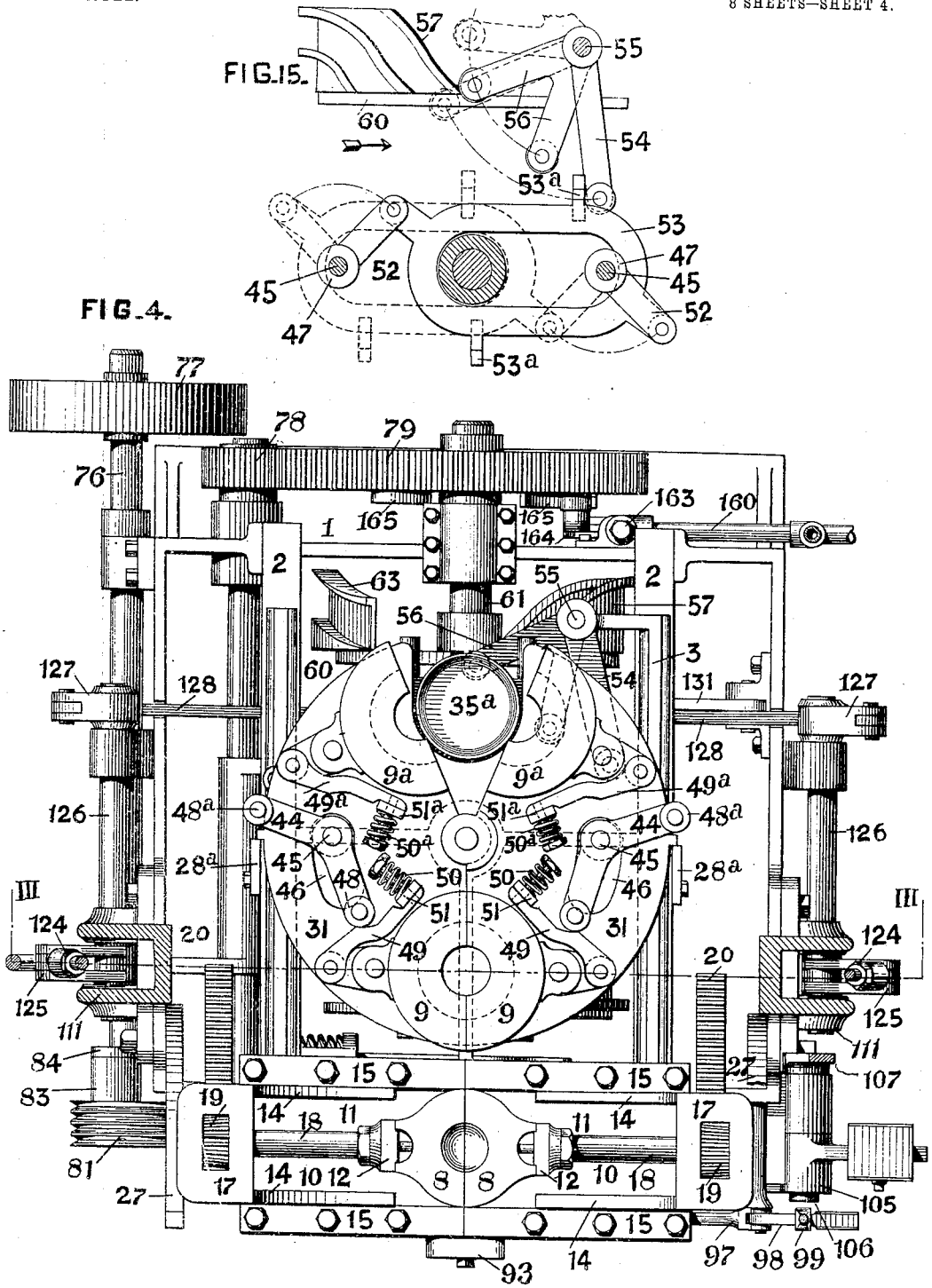

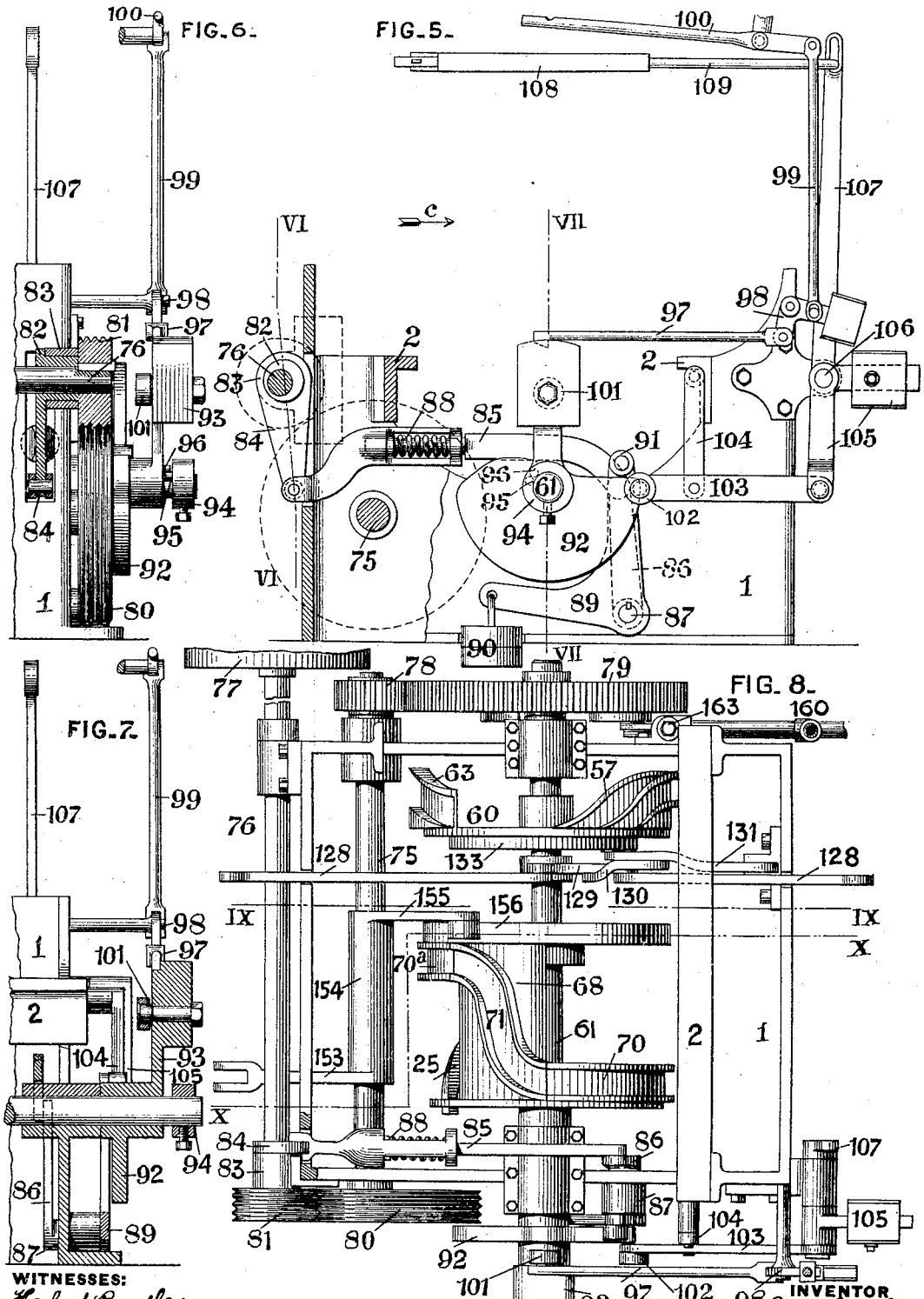

No. 767,811. PATENTED AUG. 16, 1904.
R. GOOD, Jr.
MACHINERY FOR THE MANUFACTURE OF GLASSWARE.
APPLICATION FILED FEB. 6, 1904.
NO MODEL. 8 SHEETS—SHEET 6.
FIG. 9.
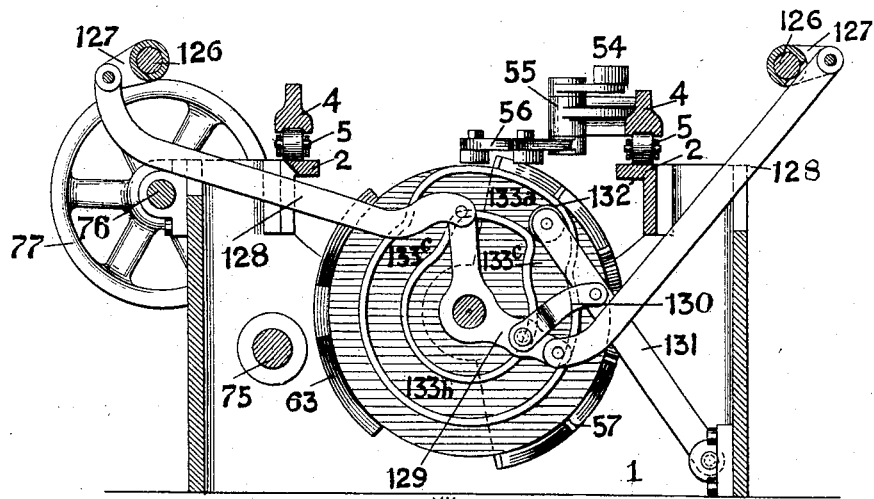
FIG. 11.
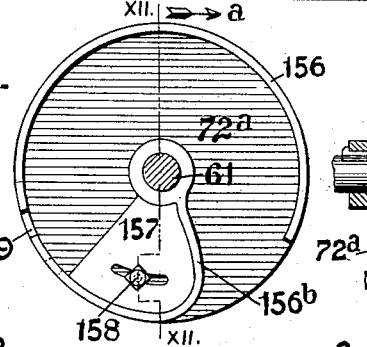
FIG. 10.
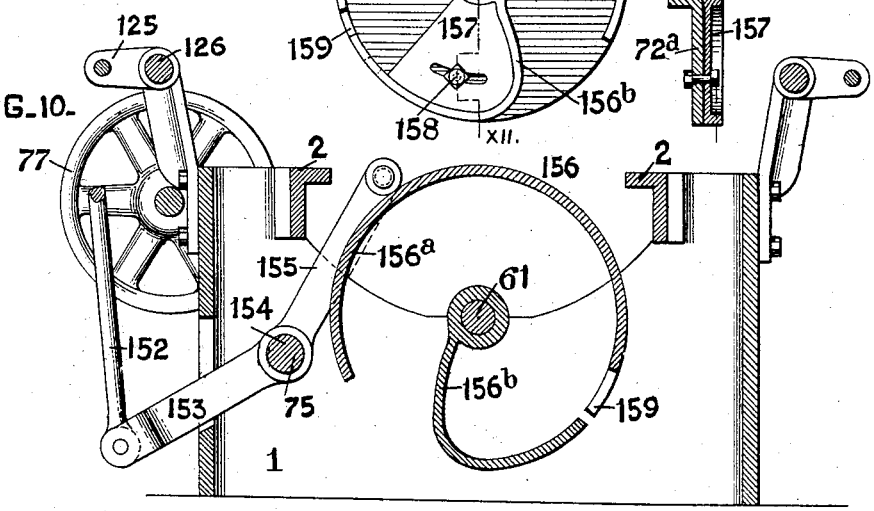
FIG. 12.
WITNESSES:
Herbert Bradley.
F. C. Gaither.
INVENTOR
Robert Good, Jr.
by Christy & Christy,
Att'ys.

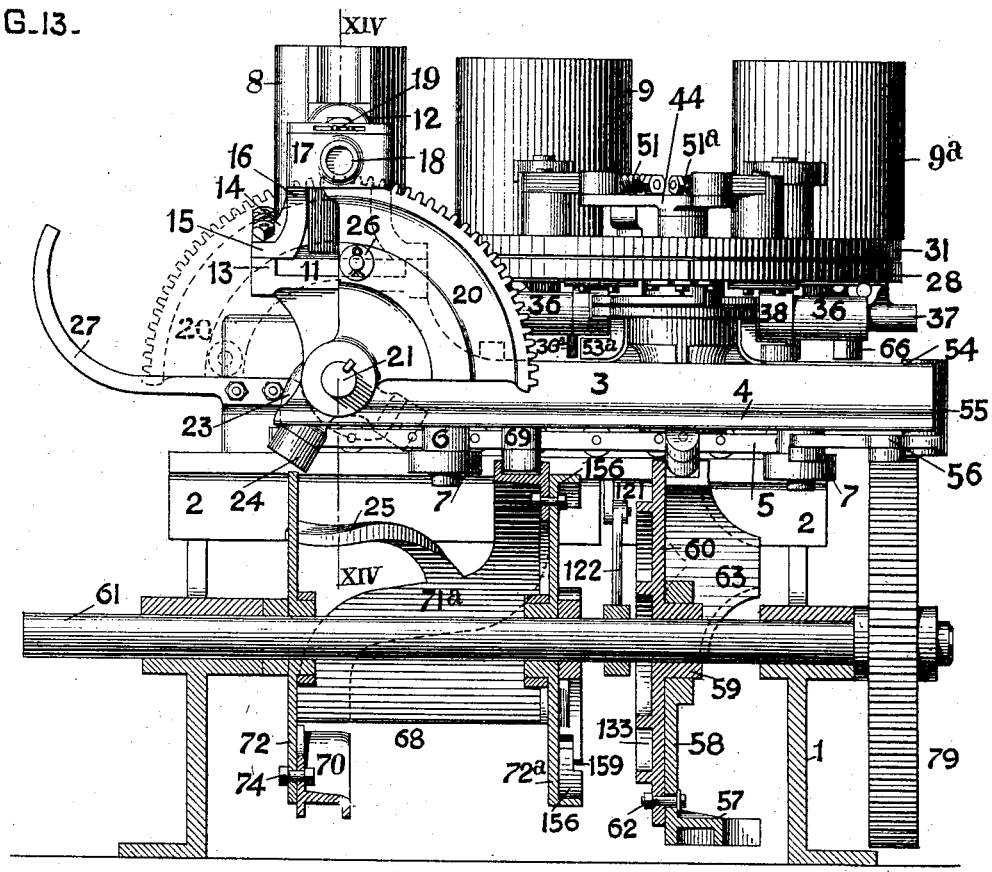

No. 767,811. PATENTED AUG. 16, 1904.
R. GOOD, Jr.
MACHINERY FOR THE MANUFACTURE OF GLASSWARE.
APPLICATION FILED FEB. 6, 1904.
NO MODEL. 8 SHEETS—SHEET 8.
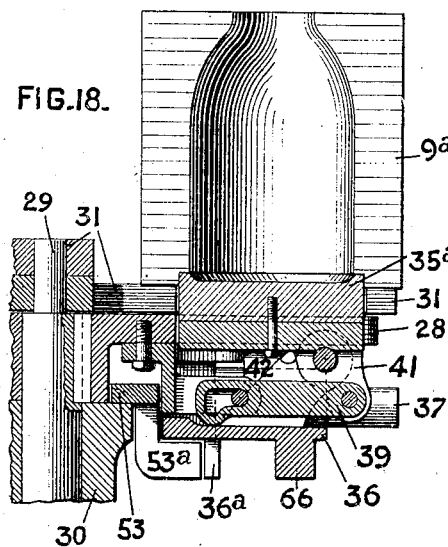
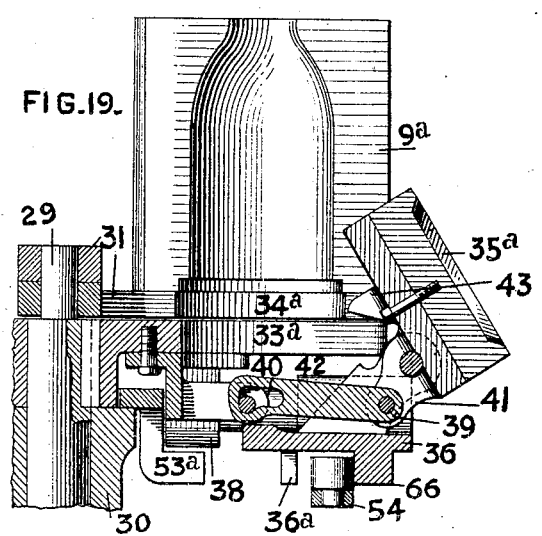
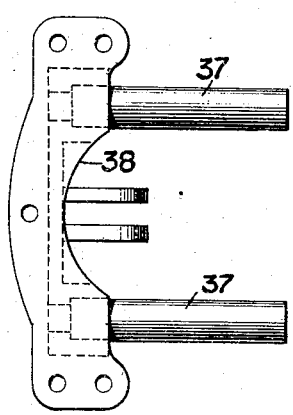
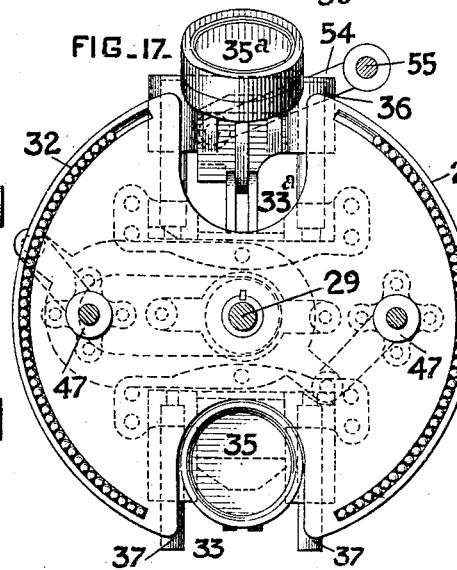
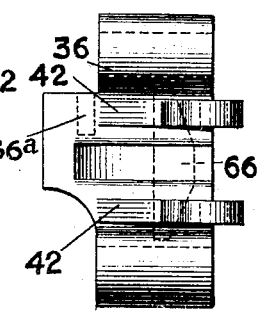
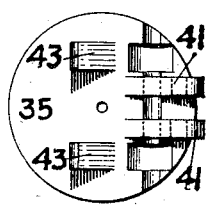
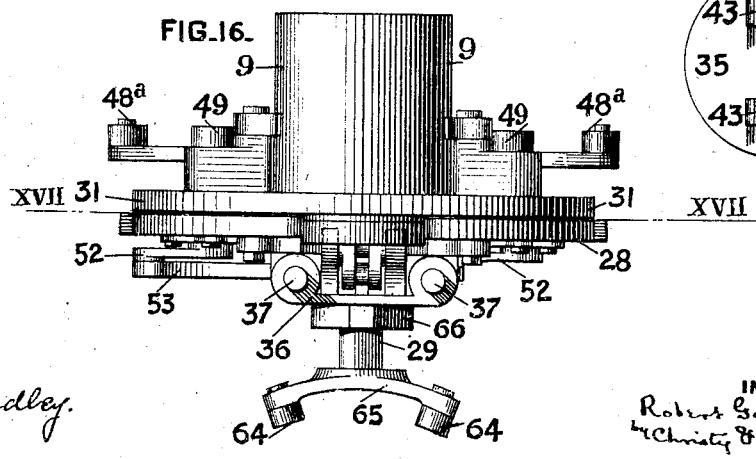
WITNESSES:
Herbert Bradley.
F. E. Gaither.
INVENTOR
Robert Good, Jr.
by Christy & Christy
Att'ys.

No. 767,811. Patented August 16, 1904.

UNITED STATES PATENT OFFICE.

ROBERT GOOD, JR., OF CLARKSBURG, WEST VIRGINIA, ASSIGNOR TO HAZEL-ATLAS GLASS COMPANY, OF WHEELING, WEST VIRGINIA, A CORPORATION OF WEST VIRGINIA.

MACHINERY FOR THE MANUFACTURE OF GLASSWARE.

SPECIFICATION forming part of Letters Patent No. 767,811, dated August 16, 1904.

Application filed February 6, 1904. Serial No. 192,304. (No model.)

*To all whom it may concern:*

Be it known that I, ROBERT GOOD, Jr., a citizen of the United States, residing at Clarksburg, in the county of Harrison and State of West Virginia, have invented or discovered certain new and useful Improvements in Machinery for the Manufacture of Glassware, of which improvements the following is a specification.

My invention relates to machinery for the manufacture of glassware; and it consists in the construction and arrangement of mechanism hereinafter described and claimed.

It embodies, among other matters, certain improvements upon the invention described and claimed by me in a prior application, filed June 8, 1903, Serial No. 160,603, and is particularly adapted to the manufacture of hollow glass articles by the well-known pressing and blowing process. I will therefore describe my present invention as embodied in a machine for the manufacture of glassware by such process, the general organization and operation of such machine being as follows: The pressing-plunger is provided with a passage through it connected with a supply of air under pressure, so that it may also serve as a blow-pipe. By the use of this type of plunger I can more conveniently both press and blow the glass at a common operating-point, and thus dispense with the operation of transferring the pressed blank from the point where it has been pressed to another blowing-point more or less distant therefrom. The passage of the air through the plunger also materially contributes to keeping the latter at the proper temperature, and I have in this respect also found it more satisfactory than the water-cooled plungers now commonly used. The form of plunger employed is, however, not an essential part of my invention, since a separate blowing member may be employed, if desired. I have illustrated and prefer to use such a plunger as is shown and described in United States Letters Patent No. 585,469. Below the plunger is arranged a primary mold support or carriage, which in its preferred form, as herein illustrated, is rectangular and is arranged to be reciprocated longitudinally upon suitable tracks mounted on the base or frame of the machine. Upon the forward end of the carriage is mounted a blank or press-mold, and a suitable distance to the rear is arranged a secondary mold-support, preferably a turn-table, secured to the upper end of a vertical shaft mounted and rotating freely in bearings secured to the carriage and in line with the center of the press-mold. Upon the turn-table at diametrically opposite points are mounted two sectional blow-molds, so that by the rotation of the table the said blow-molds may be brought alternately to a point adjacent to and in line with the press-mold. The movement of the primary mold-support is preferably accomplished and regulated by means of a cam secured to a shaft journaled in suitable bearings located in the front and rear walls of the base or supporting-frame directly below and in line with the center of the carriage. The secondary mold-support is rotated at the proper time by any suitable means, but preferably, as hereinafter shown, by another cam mounted on the shaft above mentioned, which is engaged by an arm secured to the lower end of the vertical shaft of the secondary support when the primary support has reached the rearward limit of its movement. Arranged to cooperate with the press-mold and blow-molds in their operative position below the plunger is a suitably-supported sectional neck-mold. The neck-mold sections are given a slight vertical movement by mechanism hereinafter to be described. When the press-mold containing the charge of molten glass has been brought into operative position under the plunger by the rearward movement of the primary mold-support, the neck-mold sections are closed and then lowered into position upon the press-mold. After the blank has been pressed the press-mold is automatically disengaged from the blank, as hereinafter described, and the movement of the primary mold-support then reversed to carry the press-mold away from the blank and to carry one of the blow-molds forward into position to be closed upon the blank. During this movement of the primary mold-support the pressed blank hangs *in situ* suspended by the neck-mold in the path of the approaching blow-mold, which when the primary mold-support has reached the forward limit of its movement is closed by mechanism, presently to be described, around the body of the blank immediately under the neck-mold. After the blank has blown the neck-mold is opened and then lifted, leaving the finished article inclosed in the blow-mold. The press-mold is preferably a sectional mold and is automatically closed during the forward movement of the primary mold-support by suitable means, hereinafter to be described. It is charged with the molten gather while the mold-support is at the forward limit of its movement and remains closed during the rearward movement of the mold-support and until the blank has been pressed. It is then opened, and thus disengaged from the pressed blank, preferably by means of a cam secured to the cam-shaft already mentioned. In cutting off the gather when it is dropped into the press-mold at the forward end of the machine I employ a cut-off mechanism which is suitably supported above the press-mold, as hereinafter described. This cut-off mechanism consists of a pair of substantially V-shaped coöperating knives, and the glass is dropped through the orifice between the knives and into the press-mold. As the gatherer drops the glass into the press-mold he allows the weight of his gathering-iron to rest upon a suitably-located lever-arm and depresses the same. This movement of the lever-arm by means of connections hereinafter to be described first operates the knives to cut off the gather and immediately thereafter sets the machine in motion. The carriage is then moved rearwardly, the press-mold being thus brought into operative position under the plunger, and the closed blow-mold containing the article last finished retracted. When the carriage has reached the rearward limit of its movement and while the blank is being pressed, the secondary mold-support or turn-table is given a half-revolution to carry the closed blow-mold containing the finished article to the rear of the machine, and the other blow-mold, which is open, to a point adjacent to and in line with the press-mold. Then after the blank has been pressed, the press-mold opened, and the carriage returned to the forward limit of its movement, thus bringing the open blow-mold into line with the glass blank hanging under the plunger, by means of suitable mechanism, presently to be described, the open blow-mold is closed about the blank, and simultaneously the closed blow-mold containing the finished article is opened and its bottom tipped to discharge the finished article. Air under pressure is then admitted to the combined plunger and blowpipe to blow the glass to finished form Then the neck-mold is opened and raised and the machine automatically comes to a stop. When the machine is again started by the gatherer, as hereinbefore described, and the press-mold brought under the plunger by the rearward movement of the primary mold-support and the plunger depressed to press the blank, the secondary mold-support or turn-table is again given a half-revolution, as described, to bring the other blow-mold into position to be advanced, and after that blow-mold has been advanced and as it is being closed around the blank the blow-mold containing the finished article is opened. Thus it will be seen that the press-mold is employed in the formation of the pressed blank for each article which is made, while the blow-molds are used alternately, the secondary mold-support being given a half-rotation alternately, with the reciprocation of the primary support—that is, each time that the primary support is at the rearward limit of its movement. The glass is charged into the press-mold each time at the forward end of the machine, and the finished article is discharged from the blow-mold each time at the rear of the machine, the primary mold-support being moved backward and forward—that is, reciprocated once—with each article that is made.

In the accompanying drawings, Figure 1, Sheet 1, is a front elevation of the machine; Fig. 2, Sheet 2, a longitudinal vertical section of the same, taken on the line II II of Fig. 3, showing the machine at rest, with the primary mold-support in its forward position. Fig. 3, Sheet 3, is a cross-sectional view, on a slightly-reduced scale, taken at right angles to Fig. 2, the plane of section being indicated by the line III III of Fig. 4. The blow-mold is shown empty for the purpose of better illustration, but the parts are in the same relative positions as in Figs. 1 and 2. Fig. 4, Sheet 4, is a horizontal section on the same scale as Fig. 1, taken on the line IV IV of Fig. 3. Fig. 5, Sheet 5, is a view, partly in elevation and partly in section, of the starting and stopping mechanism; and Figs. 6 and 7, Sheet 5, are longitudinal sections of the same, taken on the lines VI VI and VII VII, respectively, of Fig. 5, and at right angles thereto. Fig. 8, Sheet 5, is a plan view of the starting and stopping mechanism, together with the mechanism for transmitting motion from the main cam-shaft to the various parts of the apparatus. Fig. 9, Sheet 6, is a cross-section taken on the line IX IX of Fig. 8 looking toward the rear of the machine and illustrating the neck-mold cam and its connections. Fig. 10, Sheet 6, is a similar view taken on the line X X of Fig. 8, illustrating the plunger-operating cam and its connections. Fig. 11, Sheet 6, is a rear elevation of the same, illustrating its construction and manner of adjustment; and Fig. 12, Sheet 6, a vertical section taken on the line XII XII of Fig. 11 looking in the direction indicated by the arrow *a*. Fig. 13, Sheet 7, is a view similar to Fig. 2 of the mold-sections and body portion of the machine with the primary mold-support in its rear position, the press-mold in position below the plunger, and the turn-table carrying the blow-molds in position to be rotated by means of its cam attached to the main cam-shaft near its rear end. The molds and mold-carriers are shown in elevation. Fig. 14, Sheet 7, is a vertical cross-section taken on the line XIV XIV of Fig. 13, illustrating the mechanism for opening and closing the press-mold. Fig. 15, Sheet 4, is a detail plan view of the link and its connections for opening and closing the blow-molds. Fig. 16, Sheet 8, is a front elevation of the blow-mold turn-table and its connections. Fig. 17, Sheet 8, is a horizontal section of the same, taken on the line XVII XVII of Fig. 16, the mold-bottoms being shown in their relative positions when the mold-carriage is in its forward position after the forward blow-mold has been closed around the blank and the rear blow-mold opened to permit of the discharge of the article last finished. Figs. 18 and 19, Sheet 8, are detail sectional views, on an enlarged scale, of one of the blow-molds and its connections, further illustrating the operation of the tipping bottoms. Fig. 20, Sheet 8, is a detail plan view of one of the mold-bottom guides attached to the lower side of the turn-table; and Figs. 21 and 22, Sheet 8, are plan views of the under side of one of the mold-bottom carriers and one of the mold-bottoms, respectively. Fig. 23, Sheet 2, is a detail plan view of the cut-off mechanism. Fig. 24, Sheet 3, is a detail sectional view taken on the line XXIV XXIV of Fig. 3, illustrating the mechanism employed to support the neck-mold sections in their elevated position. Fig. 25, Sheet 2, is a detail sectional view of the valve and its connections for controlling the supply of fluid under pressure to the hollow plunger or blow-pipe.

The main frame or base 1 of the machine is of any suitable construction and is provided with longitudinal tracks or ways 2, Figs. 1, 2, 3, 4, 8, and 13, for the primary mold support or carriage 3. This carriage is provided with depending webs or flanges 4, which rest upon roller-carriages 5, interposed between the said flanges and tracks (see Fig. 14) to permit the carriage to move freely back and forth upon the tracks. In order to secure the carriage against lateral displacement, it is further provided with depending pins or studs 6, Fig. 1, carrying rollers 7, which bear against the inner edges of tracks 2.

The press-mold 8 is mounted upon the carriage 3 at a point near to its front and in line with the center thereof, and the two blow-molds 9 and $9^a$ are mounted in line therewith and with each other upon the turn-table 28, which is free to revolve in a vertical bearing located at approximately the center of the carriage. (See Figs. 2, 4, and 13.)

Referring to Figs. 1, 4, 13, and 14, the sections of the press-mold 8 are secured to and rest upon the carriers 10, which consist of sliding base-plates 11 and upright portions 12, to which the mold-sections are bolted. The base-plates 11 fit and move freely in transverse guides or grooves 13, formed on the top of the carriage 3 at its front end. The guides 13 preferably slope downwardly from the center to the sides of the carriage 3 in order to facilitate the movement of the parts when the press-mold is opened. The carriers 10 are held in position in the guides 13 by any suitable means, such as the overlapping portions 14 of plates 15, secured to the upper sides of the guides. The plates 15 are further provided with upwardly and inwardly extending wings 16, which form the bearings 17 for the screw-shafts 18, which operate to move the press-mold sections toward and from each other. The screw-shafts 18 are rigidly connected to the upright portions 12 of the press-mold carriers 10 in any suitable manner, as by a screw and lock-nut, as shown in Fig. 14, and are supported at their outer ends by bearings 17, through which they slide freely and at a slight downward angle parallel to the guides 13. The outer ends of the screw-shafts 18 are screw-threaded and pass through interiorly-threaded pinions 19, which are mounted in the bearings 17 in such a manner that they can be revolved freely without moving laterally. As the screw-threads upon the outer ends of the screw-shafts 18 are one right and the other left handed, it will be seen that when the pinions 19 are revolved in either direction the press-mold sections will be drawn apart or forced together, as the case may be. The pinions 19 are rotated by means of two segmental gear-sections 20, with which they engage, said segmental gear-sections being secured to the opposite ends of a transverse shaft 21, mounted in bearings 22, formed on the sides of the carriage 3, and located just below and in line with the center of the guides 13. A short downwardly-projecting arm 23, provided with a roll 24, is secured to the center of the transverse shaft 21 in position to be engaged by a cam-section 25, attached to the spiral cam 68 on the main cam-shaft 61, when the carriage 3 is in its rearward position and just before it starts to move forward. The cam 25 is of such a construction that when it engages the lever 23 the shaft 21 and gear-sections 20 will be given part of a revolution toward the front of the machine, as indicated by dotted lines in Fig. 13, and thereby cause their respective pinions 19 to revolve in the opposite direction and draw the press-mold sections apart. The gear-sections 20 have rollers 26 journaled upon their outer faces, and so located that at the end of the operation just described they will rest upon forwardly and upwardly curved tracks 27, secured to the frame of the machine, and as the carriage 3 moves forward the rollers 26, running on the tracks 27, will cause the gear-sections 20 to revolve in the opposite direction, thereby forcing the press-mold sections together. When the gear-sections have passed their center of gravity, they will fall of their own weight and serve to lock the press-mold sections and screw-shafts with a vise-like action.

The secondary mold-support, which carries the blow-molds, is also, preferably, mounted upon the carriage 3, and in addition to its movement with the carriage it is also made to move relatively thereto at the proper time in order to carry the blow-molds successively into position adjacent to and in line with the press-mold. In the present machine I have illustrated the arrangement which I prefer, in which two sectional blow-molds 9 and $9^a$ are mounted upon a turn-table 28 at diametrically opposite points and in line with the press-mold, so that by the successive half-revolutions of the turn-table first one blow-mold and then the other is brought into position adjacent to and in line with the press-mold. (See Fig. 4.) The turn-table 28 is keyed to the upper end of a vertical shaft 29, which is free to rotate in its bearing 30 on the mold-carriage 3, Figs. 2 and 13. It may be rotated at the proper time by any suitable means—for example, as herein shown, Figs. 13 and 16—by an arm 65, fastened to the lower end of the shaft 29, having pivoted to its opposite ends rollers 64, adapted to be engaged by a cam-section 63 on the main cam-shaft 61 when the carriage 3 is at the rearward limit of its movement. This cam-section 63 is preferably made integral with or secured to the disk 60 and is of such shape that during the period of its engagement with either of the rollers 64 it will cause the arm 65, shaft 29, and table 28 to make a half-revolution, the arm 65 being left in such position that its other roller 64 will be engaged by the cam 63 when the cam-shaft 61 has made a complete revolution—that is, after the carriage 3 has been moved forward and backward. As the carriage 3 reaches its forward position diametrically opposite projections on the periphery of table 28 are caused to abut against the stops $28^a$, mounted on the tracks 2, Fig. 3, thus centering the forward blow-mold accurately under the pressing and blowing member and serving to hold it firmly in that position.

Pivoted to the upper end of the shaft 29 and resting upon balls 32 in semicircular grooves formed on the upper surface of the table 28, Fig. 17, are two segmental disks 31, Figs. 2, 4, 13, and 16. Diametrically opposite openings are preferably formed in the periphery of the table 28 to receive the mold-bottoms hereinafter described. Corresponding semicircular openings 34 and $34^a$ are formed in the radial edges of the disks 31 near their outer ends, and the coöperating body-sections or shells of the blow-molds 9 and $9^a$ are mounted upon the disks 31 at the openings 34 and $34^a$, so that when two opposite radial edges of the disks 31 are brought into contact the opposite body-sections located thereon will be closed to form the body of the blow-mold around and above the bottom openings in the disks 31 and table 28. The segmental disks 31 are rotated simultaneously in opposite directions upon the shaft 29 a sufficient distance to alternately open and close the molds 9 and $9^a$ (see Figs. 4 and 15) by means of two horizontal arms 44, centrally secured to the upper ends of two short vertical shafts 45, passing down through slots or openings 46 in the disks 31 and journaled in bearings 47, secured to the table 28 on opposite sides of the shaft 29 and at right angles to the location of the molds 9 and $9^a$. Each of the arms 44 is provided with two horizontal rollers 48 and $48^a$, located at the opposite ends thereof. The two segmental disks 31 have each two inwardly-projecting arms or levers 49 and $49^a$ pivoted to them near their peripheries adjacent to the blow-molds and in position to be engaged by the corresponding rollers 48 and $48^a$ when the shafts 45 are partially rotated in either direction. The inner ends of the arms 49 and $49^a$ are provided with spiral springs 50 and $50^a$, which in turn are secured to uprights 51 and $51^a$, formed on the segments 31. To the lower ends of the shafts 45 are secured arms or levers 52, which are pivotally connected to the opposite ends of a link 53, Fig. 15, resting upon the bearing 30 and located directly below the transverse axis of the table 28. When the link 53 is shifted from right to left, as indicated in dotted lines in Fig. 15, the shafts 45 will be caused to rotate one to the right and the other to the left, thereby bringing the rollers 48 in contact with the arms 49, which in turn will cause the segments 31 to rotate correspondingly, thus closing the forward blow-mold and opening the other one. As the link 53 rotates with the table 28 it is always shifted from right to left after each half-revolution of the table and always acts to close the forward blow-mold and simultaneously open the rear blow-mold. The two blow-molds are therefore opened and closed in reverse. The springs 50 and $50^a$, interposed between the ends of the arms 49 and $49^a$ and the uprights 51 and $51^a$, serve to compensate for any lost motion of the parts and insure an accurate registration of the blow-mold sections when closed.

The mechanism which I prefer to employ for shifting the link 53 is illustrated in Figs. 4, 9, 13, and 15. Secured to the upper end of a vertical shaft 55, journaled at the rear of the carriage 3, is an arm 54, the other end of which when moved as hereinafter described is adapted to strike and push forward one of the depending projections 53ª on the opposite sides of the link 53 as said projections are brought in turn into its path by the rotative movement of link 53 with the table. To the lower end of the shaft 55 is secured a lever 56, the opposite end of which is adapted to be engaged by a cam-section 57. For convenience of construction this lever 56 is of duplex form, having two arms rigid with each other and with the shaft 55, Figs. 9 and 15, and the cam-section 57 is provided with a track or path for the end of each arm, Figs. 2 and 15, the two arms being acted upon successively by the double cam 57 to rotate the shaft 55 to give the arm 54 its full swing and then similarly in the reverse direction to restore the arm 54 to its original position. The arm 54 when swung forwardly first strikes the projection 53ª, Fig. 15, and thereby causes the link 53 to move from right to left. It then wipes by the projection 53ª to perform a further function presently to be described and is then returned to its original position. The cam-section 57 is preferably formed integral with a segmental disk 58, Fig. 13, rotatably mounted upon the rearwardly-extending hub 59 of the disk 60, which is keyed to the main cam-shaft 61 adjacent to the rear wall of the machine. The disk 58 is adjustably fastened on the face of the disk 60 by means of a bolt-and-slot connection 62, so that the operation of the cam-section 57 to close the forward blow-mold and simultaneously open the rear blow-mold may be made to properly succeed the operation of the cam-section 63 to rotate the table 28 and after the proper interval of time.

I have already stated that the table 28 is preferably provided with the opposite openings 33 and 33ª, Fig. 17, for the tilting bottoms of the blow-molds. It is obvious that these openings and tilting bottoms could be dispensed with and a bottom for each blow-mold be fastened to the surface of the table 28. These tilting bottoms 35 and 35ª are each hinged to a sliding mold-bottom carrier 36, Figs. 18 and 19, mounted upon two horizontal parallel guides or rods 37, Fig. 20, which project from a bracket 38, secured to the under side of the table 28 adjacent to the openings 33 and 33ª. A link 39 is attached at its inner end, by means of a pin-and-slot connection 40, to the bracket 38 and has its outer end pivoted between downwardly-projecting lugs 41, formed on the mold-bottom. The lugs 41 are so located on the mold-bottom that when its carrier 36 is moved upon the guides 37 toward the periphery of the table 28 in a manner to be presently described the links 39 will exert an eccentric pull upon the hinged bottom and cause it to be tipped outwardly. In the same way when its carrier 36 is moved in the reverse direction—that is, toward the shaft 29—the bottom will be restored to its original position to register with the body-sections of the mold when closed.

The hinges on the carriers 36 have their inner faces 42 formed to register with projections 43 upon the tilting bottoms when the latter are in their upright position and serve as supports for the same. The carriers 36 are moved outwardly to tip the bottoms by the continued travel of the arm 54, already referred to, after it has shifted the link 53 to close the forward blow-mold and open the rear blow-mold. The arm 54 in its further movement engages the projection 66 of the carrier 36 of the rear blow-mold which has just been opened, moves the same outwardly, and thereby operates to tilt the bottom, as already described. This outward movement of the carrier 36 has brought the rear projection 36ª into the return path of lever 54, Fig. 19, and as the latter returns to its original position it engages said projection 36ª, thereby returning carrier 36 and restoring the mold-bottom to upright position. As the table 28 is revolved the projection 66 of the bottom of the forward mold contacts with the stationary roll 67 on the carriage 3, Fig. 2, thus insuring that the bottom is in proper position for the blow-mold sections to close around it.

The movement of the primary mold support or carriage 3 backward and forward upon the tracks 2 is accomplished and controlled by means of a continuous spiral cam-track 68, arranged longitudinally beneath the carriage and secured to the main cam-shaft 61 in any suitable manner. (See Figs. 2, 3, and 8.) A depending stud 69, preferably provided with a roller, is located upon the under side of the carriage approximately midway between and in line with the centers of shaft 29 and press-mold 8 and engages at all times with said cam-track 68. The continuous cam-track 68 consists of two straight portions 70 and 70ª, located a distance apart equal to the desired travel of the mold-carriage and at an angle of about ninety degrees, or the distance of a quarter-turn from each other, and two substantially longitudinal connecting portions 71 and 71ª. The cam-track 68 is so adjusted upon the main cam-shaft 61 with reference to depending stud 69 that when the machine is started and the shaft commences to revolve in the direction indicated by the arrow $b$, Fig. 3, the stud will almost immediately enter upon the longitudinal connecting portion 71 and the carriage 3 be impelled toward the rear of the machine. When the main cam-shaft has made about a tenth of a revolution, the stud will have reached the straight portion 70ª and the carriage be at the rearward limit of its travel. The straight portion 70ª is of sufficient length to permit the carriage to remain in this position during the next quarter-revolution of the main cam-shaft. Then the longitudinal portion 71ª again impels it during the next one-tenth of a revolution to its original forward position, where it remains until completion of the revolution, the straight portion of track 70 being slightly more than twice as long as straight portion 70ª.

In order to facilitate the proper adjustment of the cam-track 68, I prefer to construct it of several sections held in position between two circular disks 72 and 72ª, Fig. 2, rigidly secured to the main cam-shaft 61. The portions 70 71 and a small section of portion 70ª are formed integral with each other and are provided at each end with inwardly-projecting flanges, which permit of their being rigidly secured between and to the disks 72 and 72ª, as shown in Fig. 3. The balance of portion 70ª and the portion 71ª are formed integral with each other and are provided at their ends with inwardly-projecting segmental disks 73 and 73ª, which are journaled upon the hubs of disks 72 and 72ª and are secured to said disks by means of slot-and-bolt connections 74. As the portions of cam-track 70ª and 71ª just referred to are somewhat shorter than the space between the ends of the fixed portions of track 70 and 70ª, it will be seen that the former may be adjustably rotated to and from the latter in either direction when desired by loosening the bolts 74. The cam 25 for opening the press-mold is formed integral with or attached to the adjustable track portion 71ª.

Referring to Fig. 8, the main cam-shaft 61 is journaled in and projects through suitable bearings located in the front and rear walls of the base or frame 1 and receives its motion through the medium of a counter-shaft 75 and main driving-shaft 76, which latter is provided with a driving-pulley 77, secured to its rear end. The shafts 75 and 76 are also journaled in bearings secured to the base or frame 1. The counter-shaft 75 is provided at its rear end with a pinion 78, meshing with a gear-wheel 79, secured to the shaft 61, and at its forward end with a friction-wheel 80, rotated by means of a corresponding friction-wheel 81, secured to the forward end of the driving-shaft 76. The driving-shaft 76 is mounted eccentrically in a cylindrical bearing-block 82, Figs. 5 and 6, which latter is journaled in a bearing 83, located on the frame of the machine adjacent to the friction-wheel 81. By a small rotative movement of the block 82 the shaft 76 will be moved toward or away from the shaft 75, and thereby cause the friction-wheels 80 and 81 to be brought into or out of contact with each other. The block 82 is provided with and rotated by a downwardly-projecting arm 84, preferably integral therewith, pivoted at its lower end to a link 85, extending toward and beyond the shaft 61, which link is pivoted at its inner end to the upper end of an arm 86, the lower end of which is secured to the inner end of a short longitudinal rock-shaft 87, journaled in a bearing formed in the front wall of the base 1 adjacent to the bottom. The link 85 is preferably formed of two parts connected by a spring 88, which serves to compensate for any irregularities in the adjustment of the starting and stopping mechanism and friction-wheels 80 and 81. To the outer end of rock-shaft 87 is secured a bell-crank lever 89, one arm of which carries a weight 90 and the other is provided at its end with a roller 91. The weight tends to throw the opposite arm toward the shaft 61 and hold the roller 91, mounted thereon, in the path of rotation of a cam 92. Still referring to Sheet 5 of the drawings, this cam 92 is loosely mounted upon the shaft 61 and is formed integral with a weighted arm 93, which latter stands upright when the machine is at rest, a notch upon its top being engaged by the hooked end of a rod 97, to be hereinafter described. When the rod 97 is given a pull to the right (see Fig. 5)—that is, in the direction of the arrow $c$—the weighted arm 93 will fall and the cam 92 be given a half-revolution upon the shaft 61—that is, until it engages and forces back the roller 91 on the end of the weighted bell-crank lever 89. The consequent movement of lever 89 rocks the shaft 87 and correspondingly moves the arm 86, and thus through the connections already described brings the friction-wheel 81 upon driving-shaft 76 into engagement with the friction-wheel 80 upon counter-shaft 75 and sets the machine in motion. When the shaft 61 has made a half-revolution, a projection 95 upon the inner face of a collar 94 on the end of the shaft engages a corresponding projection 96 upon the outer face of the arm 93, Figs. 5 and 6. The arm 93 is thus moved back to its upright position by the succeeding half-revolution of the shaft 61, the cam 92 still engaging the roller 91. When the arm 93 has reached its upright position, the shaft 61 having made one complete revolution, the cam 92 passes by the roller 91, the weight 90 is released, the shaft 87 and arm 86 rocked forwardly, and the friction-wheels 81 and 80 separated, the hooked end of rod 97 meanwhile engaging the notch in the top of arm 93. It will thus be seen that the machine is started by a pull exerted upon the rod 97 by means presently to be described, that the shaft 61 then makes one complete revolution, and the machine is then automatically stopped in position ready for the next operation.

The rod 97 is pivoted at its outer end to a weighted bell-crank lever 98, journaled upon the frame of the machine, Fig. 5. The weighted arm of bell-crank 98 is connected, by means of a connecting-rod 99, to the short arm of a lever 100, pivoted on the cross-beam of the machine in such a position that its long arm will project above the cut-off mechanism directly over the press-mold 8 when the same is in position to receive a charge of molten glass and so that it can be easily depressed by the gathering-iron of the operator simultaneously with the placing of the molten glass in the press-mold. The lower end of rod 99 is slotted to allow of a slight play of the parts. As the operator drops the gather of molten glass into the press-mold he depresses the free end of rod 100 by means of his gathering-iron, and through the connections already described sets the machine in motion. As the weight 93 falls and just before the cam 92 strikes the roller 91 the gather is automatically cut-off by the mechanism now to be described.

Still referring to Fig. 5, the weighted arm 93 is provided upon its face with a roller 101, which when the arm falls comes into contact with a roller 102, mounted on the end of an arm or lever 103, pivoted to a swinging link 104, attached to the frame of the machine, and imparts a quick outward thrust to said arm 103. The outer end of arm 103 is pivotally connected to a weighted bell-crank lever 105, rigidly secured to one end of a short shaft 106, mounted in bearings secured to the frame of the machine. An upwardly-projecting arm 107 is rigidly secured to the opposite end of shaft 106 and has its upper end slotted to allow of its being connected to the cut-off mechanism 108 in any suitable manner, as by a rod 109. The cut-off mechanism 108 (see Figs. 1, 2, and 23) is supported in its proper position with relation to press-mold 8 from a cross-beam 110, resting upon uprights 111, secured to the sides of base 1, and is adjustably attached to said cross-beam by means of depending bolts or studs 112. The cut-off mechanism 108 may be of any desired form, and I have shown it to consist of two superposed plates $108^a$ and $108^b$, Fig. 23, provided with coöperating V-shaped cutting edges and movable toward and from each other in the main frame of the cutter. One of the knives $108^b$ is connected directly to the rod 109, and the other, $108^a$, is provided with a lever 113, pivoted at its center to the frame of the cutter and having its outer end connected, by means of a bent rod 114, to the rod 109. By this arrangement when the rod 109 is moved forward and back the cutter-blades will be caused to move toward and from each other. Thus as the roller 101 strikes the roller 102, and thereby imparts an outward thrust to the arm 103, Figs. 1 and 5, a corresponding inward thrust is imparted to the rod 109, the cutters are operated to cut off the gather, and as the roller 101 passes the roller 102 the cut-off mechanism is restored to its original position by the weight on the free arm of bell-crank lever 105.

Referring to Figs. 1, 2, 3, and 24, the neck-mold 113 is supported from the cross beam or frame 110 immediately below and adapted to close in line with the pressing and blowing member. It consists of two sections 114, slidably mounted on the under side of a plate 115 and movable toward and from each other. The plate 115 is provided with a central opening containing the plunger-ring 116, which is of any suitable construction and serves to complete the mold between the neck-mold and plunger, as shown in Figs. 2 and 3. The plate 115 is given a slight vertical movement into and out of operative position, and for that purpose, as well as for opening and closing the neck-mold sections 114, I preferably make use of the following mechanism: Each end of the plate 115 is provided with two short uprights 117, Figs. 3 and 24, between which are pivoted bell-crank arms or levers 118, the short depending arms of which extend through openings in the plate 115 and are loosely connected to the neck-mold sections 114, as by extending into openings in the latter. The other arm of each lever 118 projects outwardly between the plates 119, pivotally secured at their lower ends to the adjacent uprights 117 and extending upwardly between the sides of the frame 110. Each of the plates 119 is provided with a roller, which bears against the adjacent inner face of the frame 110 and is adapted to roll vertically thereon. A wedge-block 120 is fitted between the upper ends of each pair of plates 119 and is held in place by means of a long bolt 121, which passes down through it and is tapped into a nut 122, secured as against vertical movement between the plates 119 at about their centers. As the wedge-blocks 120 are forced down between the plates 119 by means of the screw-bolts 121 the plates will be forced apart and their rollers caused to bear with more or less friction against the adjacent inner faces of the frame 110, so as to hold the neck-mold 113 and its component parts in the position to which it is moved. The neck-mold 113 is provided with vertical guide-rods 123, extending upwardly through guide-bearings on the outer walls of the frame 110. When the outer ends of the levers 118 are moved downwardly, they first act to slide the sections 114 of the neck-mold together, and then by their continued downward movement they cause the neck-mold frame 115 to move bodily downward into operative position. When the levers 118 are moved upwardly, they act to first separate the neck-mold sections 114 and then move the neck-mold frame 115 bodily upward, where it is held in position by means of the friction-plates 119 and their connections. The outer ends of the levers 118 are connected by links 124 (preferably made adjustable in length by means of interposed turnbuckles, so as to make the neck-mold adjustable to the height of the article to be made) to arms 125, rigidly secured to the forward ends of horizontal rock-shafts 126, journaled in bearings secured to the opposite sides of the frame of the machine. (See Figs. 3, 4, 9, and 10.) To the rear ends of the shafts 126 are rigidly secured arms 127, which are connected by links 128 to a rocker 129, loosely mounted on the cam-shaft 61 adjacent to the disk 60. One of the arms of rocker 129 is connected, by means of a short link 130, to an arm 131, Fig. 9, which is pivoted at its lower end to the right-hand side wall of the base 1 near its bottom and is provided at its opposite end with a roller 132, which engages a cam-track 133, formed upon the forward face of the disk 60. The cam-track consists of two concentric portions 133ª and 133ᵇ, having different radii connected by intermediate portions 133ᶜ to form a continuous track. The portion 133ª, which has the greater radius, is shorter than the portion 133ᵇ. When the machine is at rest, the roller is in engagement with the portion 133ª and remains so during the initial rotation of the shaft 61 or until the press-mold is in position under the neck-mold. As soon as the press-mold arrives in this position the arm 131 is forced toward the shaft 61 by reason of the engagement of roller 132 with cam portion 133ᵇ and so remains until the shaft 61 has nearly completed its revolution, during which time the operation of pressing and blowing the article has been completed. It is then by means of cam portion 133ᶜ restored to its original position in portion 133ª by the time that the machine comes to a rest. As the arm 131 is forced toward the shaft 61 it imparts a rotary motion by means of the link 130 to the rocker 129, which in turn through the medium of the links 128 causes the rock-shafts 126 to turn in their bearings and by means of the connecting-links 124 and levers 118 in the manner already described first closes the neck-mold sections and then lowers the same bodily upon the press-mold. Just before the machine stops, as above stated, the roller 132, passing from the portion 133ᵇ to the portion 133ª, effects the reverse operation, first separating the neck-mold sections and then lifting them.

The pressing-plunger 134, Fig. 3, which, as already stated, is hollow and adapted to serve as a blowpipe, is substantially similar to that shown and described in Letters Patent No. 585,469, dated June 29, 1897, and is herein shown as provided with an interior passage having communication at the top with a source of fluid under pressure and closed at the point by a valve 135. The stem of this valve passes upwardly through the passage and is provided at its top with a nut 136. Between the nut and the top of the hollow plunger is interposed a small spring 137, the tension of which is sufficient to hold the valve 135 normally closed. When, however, fluid under pressure is admitted to the plunger, it easily overcomes the tension of said spring and opens the valve 135. The plunger 134 is carried by a cross-head 138, vertically movable on upright guides or columns 139, rising from the frame 110 and joined together at their upper ends by a cross-piece 140. The plunger is located centrally between the upright columns and is guided at its lower end in an opening 141 in the frame. It is preferably adjustably secured to the cross-head 138 in any suitable manner, as by an upper extension-piece 142, screwed into the cross-head and held therein by jam-nuts 143, and to which it is also securely attached by means of screw-threaded bolts or rods 144, which extend through the plunger-head and extension 142 and up and into corresponding openings formed in the cross-head. The cross-head is also provided with an upwardly-extending guide-rod 145, which slides through an opening in the cross-piece 140. Any suitable mechanism may be employed for operating the plunger; but I prefer and have illustrated mechanism substantially similar to that shown and described in Letters Patent No. 674,378, dated May 21, 1901, which consists of a bent arm or bell-crank 146, Fig. 3, one end of which is preferably bifurcated and pivoted to the stationary cross-piece 140 and the other end provided with a rod 147, carrying an adjustable weight 148. The elbow of the bent arm 146 is connected by links 149 to the movable cross-head 138 of the plunger, and the free end of its weight-carrying arm is connected by a link 150 with one end of a lever 151, which is fulcrumed intermediate of its ends at one side of the frame 110. The lower end of this lever 151 is connected by a link 152 (which is preferably made adjustable in length by a turnbuckle) to the outer end of an arm 153, formed integral with a sleeve 154, which is free to rotate upon the counter-shaft 75. (See Fig. 8.) The opposite end of sleeve 154 is provided with an inwardly-projecting arm 155, Figs. 10 and 11, provided on its end with a roller which is normally engaged by and rests upon a cam 156, secured to the rear face of disk 72ª, attached to the cam-shaft 61. The cam 156, as shown in Figs. 10, 11, and 12, is made up of a circumferential flange portion 156ª and a radial flange portion 156ᵇ, extending from said circumferential portion inwardly toward the shaft 61. The rear end of the circumferential portion 156ª terminates a short distance from one side of the radial portion 156ᵇ, so as to leave a space into which the roller on the arm 155 can enter and allow said arm to fall in the direction of shaft 61 when the cam has arrived at this point of its travel. The roller on arm 155 will be again forced up and onto the circumferential portion 156ª by means of the radial portion 156ᵇ as the revolution of the shaft continues. When the arm 155 is free to fall toward the shaft 61, support is withdrawn from the weighted arm 146 at the top of the machine. The arm 146 will therefore drop and the plunger cross-head 138 and plunger be forced down by the straightening of the toggle formed by the arm 146 and links 149. The cam 156 continuing to rotate will cause the radial flange 156ᵇ to engage the roller on arm 155 and force the latter outward and onto the circumferential flange 156ª, thus depressing the outer end of arm 153 and through the described connections elevating the weighted arm 146 and withdrawing the plunger from the mold.

In order to provide for the proper adjustment of the radial flange 156$^b$ and end of circumferential flange 156$^a$, the former and a small section of the latter are formed integral with each other and separate from the main circumferential flange and are mounted upon a segmental disk 157, which is free to rotate upon the shaft 61. The segmental disk 157 is adjustably secured to the disk 72$^a$ by means of a bolt-and-slot connection 158, and the fixed and adjustable portions of the circumferential flange are cut out at their meeting point to overlap, and thus form a continuous surface, as indicated at 159, Fig. 10.

As before stated, the combined plunger and blowpipe is suitably connected with a supply of fluid under pressure. For that purpose I provide a pipe 160, connected at one end to the source of supply and at the other by means of a flexible hose connection 161 to a suitable passage in the movable cross-head 138, Fig. 3. The pipe 160 is provided with a cock or valve 162 of any suitable construction for admitting and shutting off the supply of fluid under pressure, said valve being operated and controlled by mechanism constructed and arranged as follows, Figs. 4, 8, and 25: The valve 162, which is of the puppet type, is located upon the back wall of the base or frame 1 in the position indicated by dotted lines in Fig. 3 and is opened and closed by means of a rod 163, pivoted to the short arm of a bell-crank lever 164, hinged to the valve-casing. The long end of bell-crank lever 164 is provided with a roller which is engaged alternately by two cam-sections 165, adjustably secured to the inner face of gear-wheel 79 and which act to move the lever 164 in opposite directions, and thereby open and close valve 162 at the proper time.

The operation of the complete machine hereinbefore shown and described is as follows: Assuming that a glass article has just been finished and the machine has come to a stop in the position illustrated in Fig. 2—namely, with the carriage 3 in its forward position, the press-mold under the cutter, the forward blow-mold containing the article last finished still standing closed under the plunger, the neck-mold open and elevated, and the rear blow-mold open—the gatherer drops the charge of molten glass through the orifice of the cutter into the press-mold 8 and with his gathering-iron depresses the free end of lever 100. This through the described connections turns the weighted arm 93 on the shaft 61 and permits it to fall by gravity. As the arm 93 falls its roller 101 strikes and imparts a sudden thrust to the bar 103, which latter operates the cutter to cut off the gather. When the arm 93 reaches the limit of its fall, the cam 92 strikes and pushes back the end 91 of bell-crank 89, thereby rocking shaft 87 and through the described connections bringing friction-wheel 81 into engagement with friction-wheel 80, and thereby setting the machine in motion. The depending stud 69 on carriage 3 is just at the entrance to the longitudinal portion 71 of cam 68, and as the shaft 61 commences to revolve the carriage is moved rearwardly until the press-mold has come into position under and in line with the plunger. The stud 69 has now reached the straight portion 70$^a$ of cam 68, and while it remains in said straight portion and the carriage is at rest the following movements take place: First, the roller 132 on the end of arm 131 enters the portion 133$^b$ of the neck-mold cam and in doing so, by means of the mechanism already described, effects, first, the closure of the neck-mold sections and then the lowering of the closed neck-mold upon the press-mold. Second, as soon as the above operation has been completed the end of the circumferential portion 156$^a$ of the plunger-operating cam 156 passes the end of arm 155, thus releasing the weight 148 and permitting the latter to fall and impel the plunger into the glass in the press-mold. After a sufficient dwell the roller on the end of arm 155 is engaged by the radial portion 156$^b$ of cam 156 and the plunger withdrawn from the mold. Third, while the pressing of the glass in the press-mold is being performed the cam 63 at the rear of the machine engages one of the rollers 64 on the arm 65 of the shaft 29, giving the said shaft a half-turn, and thus imparting a half-revolution to the table 28, carrying the closed blow-mold containing the article last finished to rear of the machine and the open and thus far inactive blow-mold into position adjacent to and in line with the press-mold. Fourth, as soon as the glass has been pressed and the plunger withdrawn the cam-section 25 engages the roller 24 on the arm 23, thereby rotating the shaft 21 and through the described connections operating the screw-shafts 18 to draw the press-mold sections apart, leaving the pressed blank suspended from the neck-mold. The above operations having been performed, the stud 69 has reached the other longitudinal portion 71$^a$ of cam 68 and the carriage 3 is moved forwardly back to its original position, the rollers 26 on the faces of gear-sections, as already explained, traversing the curved tracks 27, and thereby effecting the reclosure of the press-mold during such movement. The stud 69 has now reached the straight portion 70 of cam 68, the carriage 3 is in its forward position, and the thus far inactive blow-mold is standing open ready to be closed upon the pressed blank still suspended *in situ* from the neck-mold. The cam 57 now immediately engages the lever-arm 56, and the arm 54 is thereby moved to push the link 53 from right to left and by the mechanism already described close the forward blow-mold around the body of the pressed blank. Simultaneously and by the same movement of the link 53 and segments 31 the rear blow-mold containing the article last finished is opened and the arm 54, continuing its movement, tips the bottom of the open mold to discharge the finished article. As soon as the blow-mold has been closed around the pressed blank the valve 162 is opened by one of the cam projections 165 upon the gear-wheel 79 and air under pressure passes through the plunger and into the body of the blank to expand the same to the contour defined by the inner wall of the blow-mold. The stud 69 having now almost reached the end of the straight portion 70 the roller 132 of arm 131 passes into the portion 133$^a$ of the neck-mold cam and operates the neck-mold mechanism to first separate the neck-mold sections and then lift them together away from the neck-mold. Meanwhile, when the shaft 61 has made a half-revolution the projection 95 on its collar 94 had engaged the projection 96 on the arm 93 and has commenced to lift the same, so that now just as the stud 96 has reached the end of straight portion 70 of cam 68 and the shaft 61 has made a complete revolution the arm 93 reaches an upright position, the cam 92 releases the weight 90, friction-wheel 81 is separated from friction-wheel 80, and the machine comes to a stop with a finished article inclosed in the blow-mold under the plunger and the press-mold standing closed under the cutter ready to receive its charge of molten glass. The closure of the air-valve may of course be effected by the other cam projection 165 at any desired time. It may be closed before the machine comes to a stop, or the valve may be allowed to remain open and a cooling blast directed into the finished article until the machine is again started.

I have herein illustrated and described a complete machine in the form which I regard as the preferable embodiment of my invention. It is, however, obvious that the specific mechanism of this machine may be altered in many respects without materially changing its general organizatian and operation, and it is also obvious that certain features of my invention may be employed in machines of other types.

What I claim, and desire to secure by Letters Patent, is—

1. In a machine for the manufacture of glassware, the combination with a primary movable mold-support, of a blank-mold mounted thereon, a secondary mold-support also mounted on the primary support and movable relatively thereto, a plurality of finishing-molds mounted on the secondary support, means for moving the primary support, and means for moving the secondary support relatively to the primary support, to carry the finishing-molds successively into position adjacent to and in line with the blank-mold, substantially as described.

2. In a machine for the manufacture of glassware, the combination with a blank-support adapted to retain a glass blank in the path of an approaching finishing-mold, of a primary movable mold-support, a blank-mold mounted thereon, a secondary mold-support also mounted on the primary support and movable relatively thereto, a plurality of finishing-molds mounted on the secondary support, means for moving the secondary support relatively to the primary support to carry the finishing-molds successively into position adjacent to and in line with the blank-mold, and means for moving the primary support to carry the blank-mold alternately with each of the finishing-molds into position to coöperate with the blank-support, substantially as described.

3. In a machine for the manufacture of glassware, the combination with a sectional neck-mold, of a primary movable mold-support, a blank-mold mounted thereon, a secondary mold-support also mounted on the primary support and movable relatively thereto, a plurality of finishing-molds mounted on the secondary support, means for moving the secondary support relatively to the primary support to carry the finishing-molds successively into position adjacent to and in line with the blank-mold, means for moving the primary support to carry the blank-mold alternately with each of the finishing-molds into position to coöperate with the neck-mold, and means for closing and opening the neck-mold, substantially as described.

4. In a machine for the manufacture of glassware, the combination with an internal forming member, of a primary movable mold-support, a blank-mold mounted thereon, a secondary mold-support also mounted on the primary support and movable relatively thereto, a plurality of finishing-molds mounted on the secondary support, means for moving the secondary support relatively to the primary support to carry the finishing-molds successively into position adjacent to and in line with the blank-mold, and means for moving the primary support to carry the blank-mold alternately with each of the finishing-molds into position to coöperate with the internal forming member, substantially as described.

5. In a machine for the manufacture of glassware, the combination with a pressing and blowing member, of a reciprocatory primary mold-support, a press-mold mounted thereon on one side of the pressing and blowing member, a secondary relatively movable mold-support also mounted on the primary support on the opposite side of the pressing and blowing member, a plurality of blow-molds mounted on the secondary support, means for moving the secondary support relatively to the primary support to carry the blow-molds successively into position adjacent to and in line with the press-mold, and means for reciprocating the primary support to carry the press-mold alternately with each of the blow-molds into position to coöperate with the pressing and blowing member, substantially as described.

6. In a machine for the manufacture of glassware, the combination with a pressing and blowing member, of a sectional neck-mold adapted to be closed in line therewith, a reciprocatory primary mold-support, a press-mold mounted thereon at one side of the pressing and blowing member, a secondary relatively movable mold-support also mounted on the primary support on the opposite side of the pressing and blowing member, a pair of sectional blow-molds mounted on the secondary support, a main source of power, and sets of mechanism connected to said main source of power and operating, respectively, one set to move the secondary support relatively to the primary support to carry the blow-molds alternately into position adjacent to and in line with the press-mold; a second set, to reciprocate the primary support to carry the press-mold alternately with each of the blow-molds into and out of position to coöperate with the neck-mold; a third set, to close the neck-mold upon the press-mold in line with the pressing and blowing member, hold said neck-mold closed and *in situ* during the successive operations of the pressing and blowing member, and then open said neck-mold; a fourth set, to disengage the press-mold from the pressed blank; a fifth set, to close the adjacent blow-mold about the body of the pressed blank, and simultaneously open the other blow-mold; a sixth set, to operate the pressing and blowing member to coöperate with the press-mold and form the blank; and a seventh set, to admit fluid under pressure to the pressing and blowing member, substantially as described.

7. In a machine for the manufacture of glassware, the combination with an internal forming member, a horizontally-reciprocable mold-support, and a plurality of molds mounted thereon, of means for reciprocating the mold-support into and out of position to coöperate with the forming member, and means for also moving the mold-support in a line at an angle to that of its reciprocatory movement and in alternation with its reciprocation, substantially as described.

8. In a machine for the manufacture of glassware, the combination with an internal forming member, a horizontally-reciprocable rotary mold-support, and a plurality of molds mounted thereon, of means for reciprocating the mold-support into and out of position to coöperate with the forming member, and means for rotating the mold-support in alternation with its reciprocation, substantially as described.

9. In a machine for the manufacture of glassware, a pair of oppositely-disposed carriers, a common pivot therefor, coöperating mold-sections mounted on said carriers on opposite sides of their pivotal point, and means for moving said carriers on their pivot in opposite directions to close the mold-sections on one side of the pivot and open the mold-sections on the other side, substantially as described.

10. In a machine for the manufacture of glassware, a pair of oppositely-disposed angular plates pivoted at their apexes to a common point, coöperating mold-sections mounted on the opposing edges of said plates on opposite sides of their pivotal point, and means for moving said plates on their pivot in opposite directions to close the mold-sections on one side of the pivot and open the mold-sections on the other side, substantially as described.

11. In a machine for the manufacture of glassware, the combination with a mold-support, a sectional mold mounted thereon, and a depending bracket attached to the mold-support, of a movable carrier mounted on the bracket, a mold-bottom hinged to said carrier and eccentrically connected to said bracket, and means for moving the carrier to tip the bottom, substantially as described.

12. In a machine for the manufacture of glassware the combination with an internal forming member, a mold-support, and a plurality of molds mounted thereon, of means for moving the mold-support in a plane non-coincident with the line of movement of the forming member, and means for reciprocating the mold-support in a plane at an angle to the line of movement of the forming member, substantially as set forth.

13. In a machine for the manufacture of glassware the combination with an internal forming member, a reciprocable mold-support, and a plurality of molds mounted on the mold-support with their axes parallel with the line of movement of the forming member, of means for reciprocating the mold-support into and out of position to coöperate with the forming member, and means for also moving the mold-support in a line at an angle to that of its reciprocatory movement, substantially as set forth.

14. In a machine for the manufacture of glassware, the combination with an internal forming member, a horizontally-reciprocable mold-support, a plurality of sectional molds mounted thereon, and means for opening and closing said molds, of means for reciprocating the mold-support into and out of position to coöperate with the forming member, and means for also moving the mold-support in a line at an angle to that of its reciprocatory movement and in alternation with its reciprocation, substantially as described.

15. In a machine for the manufacture of glassware, the combination with an internal forming member, a horizontally-reciprocable rotary mold-support, a plurality of sectional molds mounted thereon, and means for opening and closing said molds, of means for reciprocating the mold-support into and out of position to coöperate with the forming member, and means for rotating the mold-support in alternation with its reciprocation, substantially as described.

In testimony whereof I have hereunto set my hand.

ROBERT GOOD, JR.

Witnesses:
   CLYDE M. CRIST,
   W. D. DABOLD.